Oct. 13, 1925.

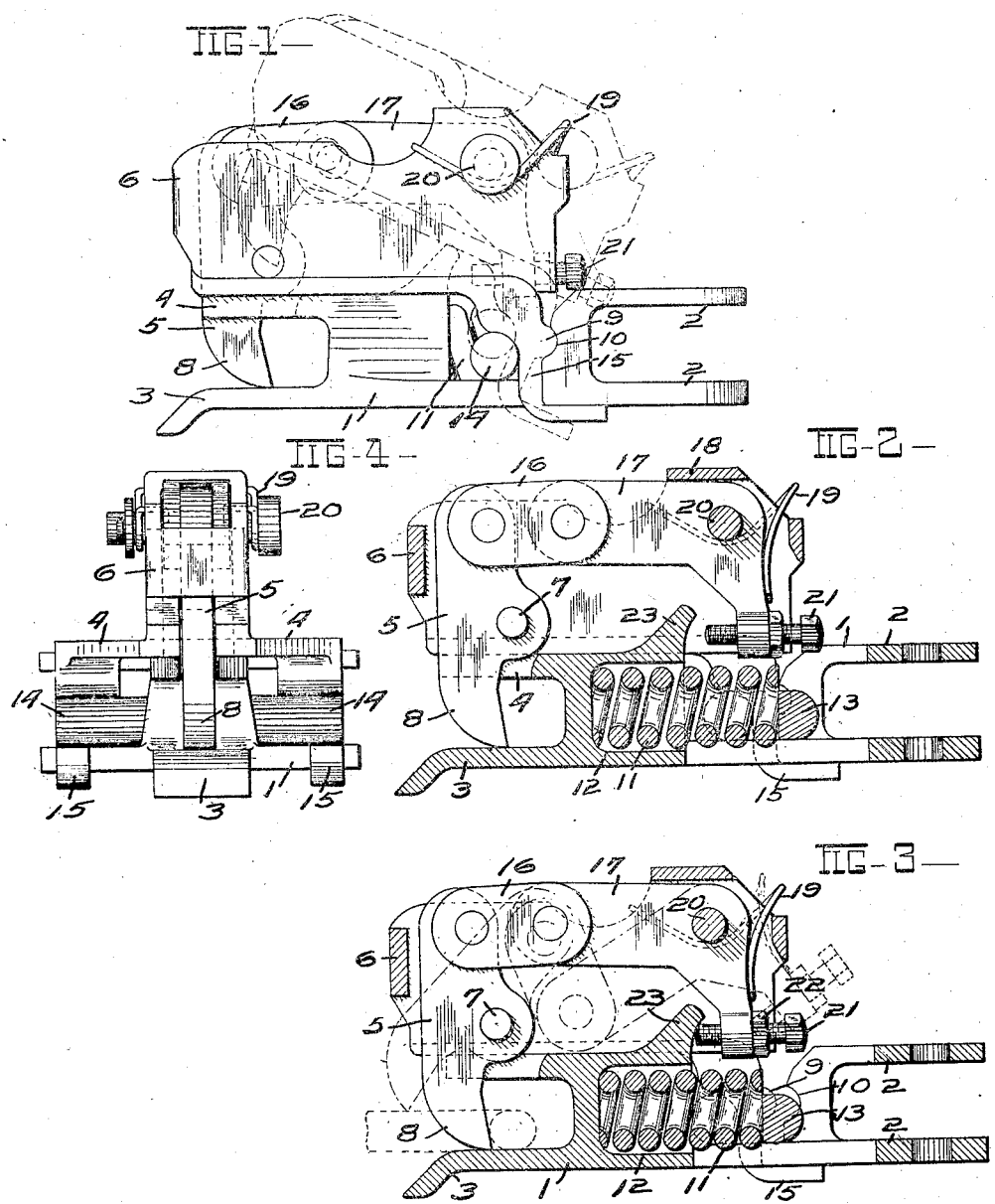

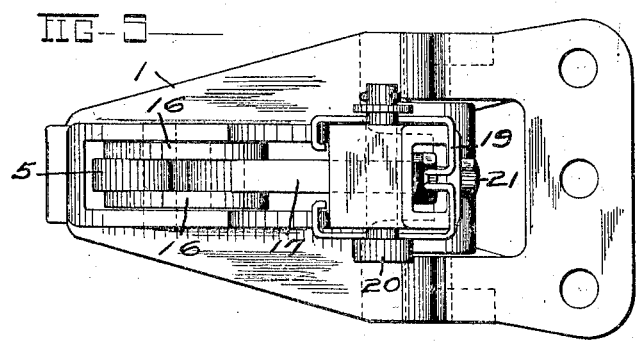
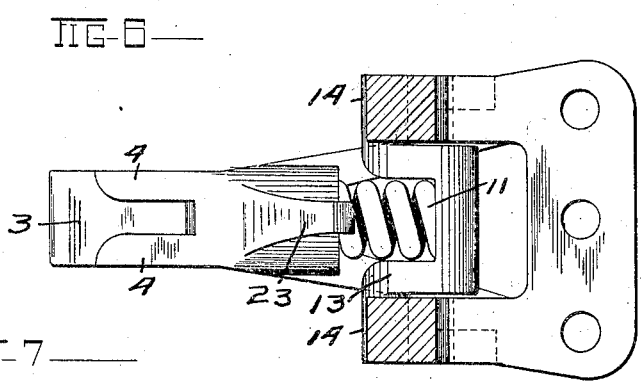
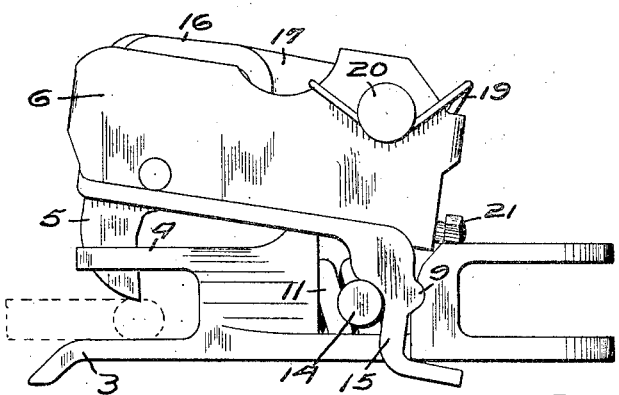

L. E. CONNER 1,557,141

OVERLOAD RELEASE COUPLING

Filed Aug. 18, 1922     4 Sheets-Sheet 3

INVENTOR
Lawrence E. Conner
by
Owen Owen & Crampton

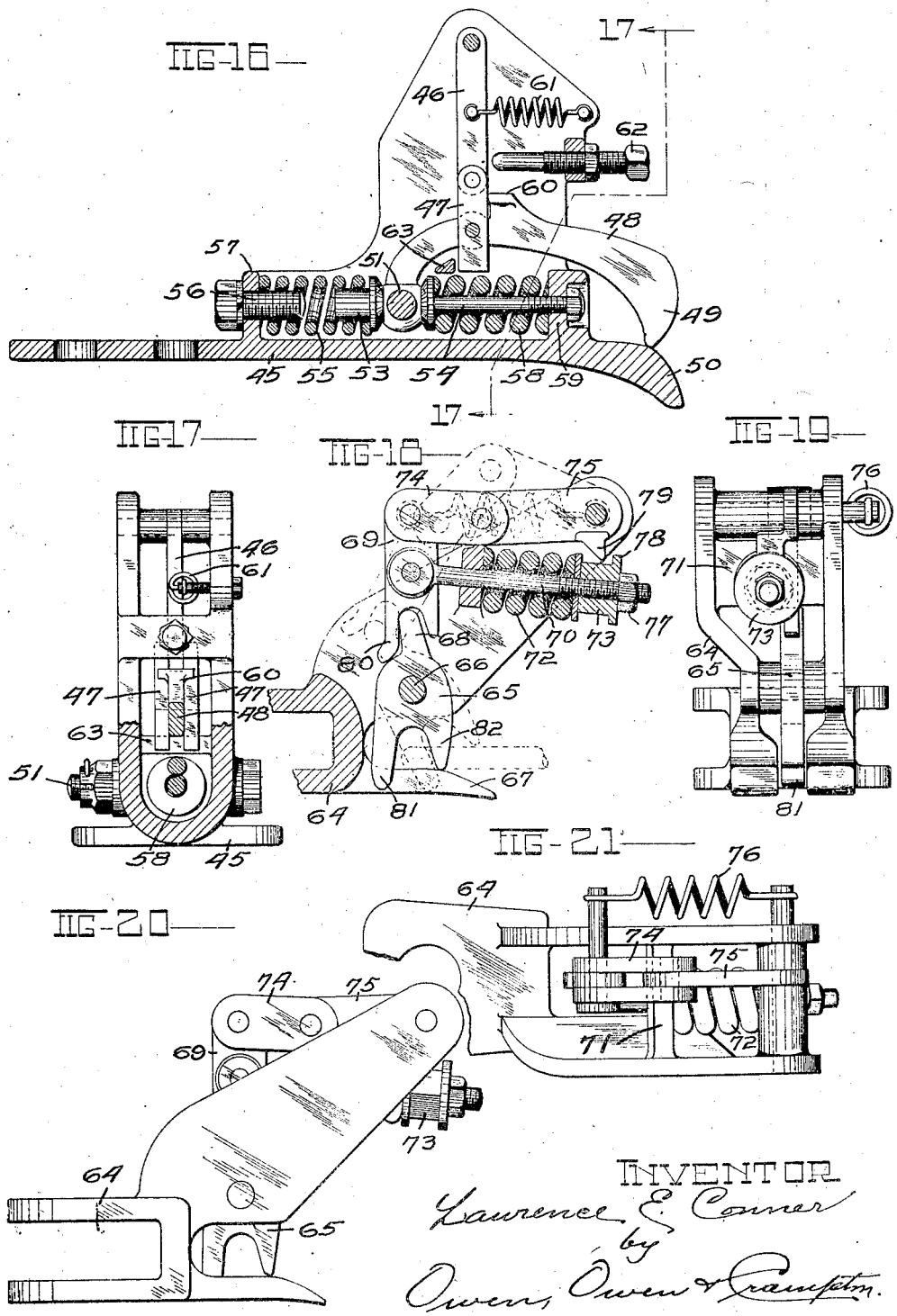

Patented Oct. 13, 1925.

1,557,141

UNITED STATES PATENT OFFICE.

LAWRENCE E. CONNER, OF JACKSON, MICHIGAN.

OVERLOAD RELEASE COUPLING.

Application filed August 18, 1922. Serial No. 582,580.

*To all whom it may concern:*

Be it known that I, LAWRENCE E. CONNER, a citizen of the United States, and a resident of Jackson, in the county of Jackson and State of Michigan, have made an invention appertaining to an Overload Release Coupling; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a coupling for connecting any trailing device, such as a conveyance or vehicle or agricultural implement, such as a plow, to a tractor. It particularly has for its object to provide in a coupling an automatic means for disconnecting or unhitching the trailing device from the tractor when the draft increases beyond a certain limitation. The invention finds its greatest advantage when used in connection with agricultural implements since the hitch will automatically operate to disconnect the implement, such as the plow, from the tractor if the plow engages a root or stone, or other obstacle that would, if the plow be not unhitched from the tractor, damage or break the plow or other agricultural implement. Further objects and advantages of the invention will appear from the following description and upon examination of the drawings forming a part hereof.

The invention may be contained in structures of different forms, and to illustrate a practical application of the invention I have selected two or three forms of structures as examples of such structures and shall describe them hereinafter. The particular structures selected for purposes of illustration of embodiments of my invention are shown in the accompanying drawings.

Figure 8:
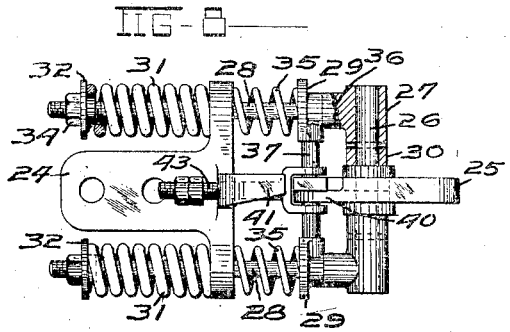
Figure 9:
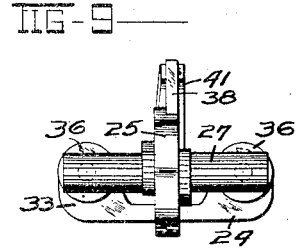
Figure 10:
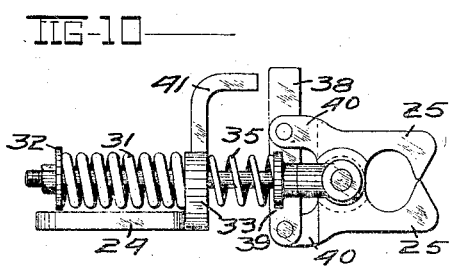
Figure 11:
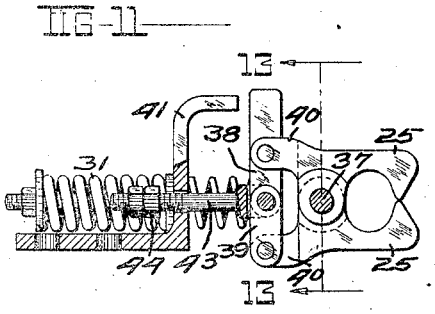
Figure 12:
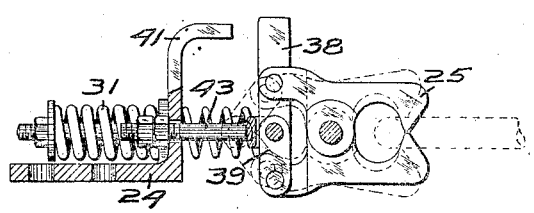
Figure 13:
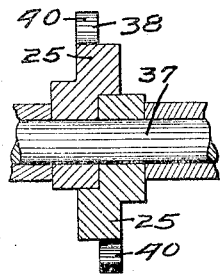
Figure 14:
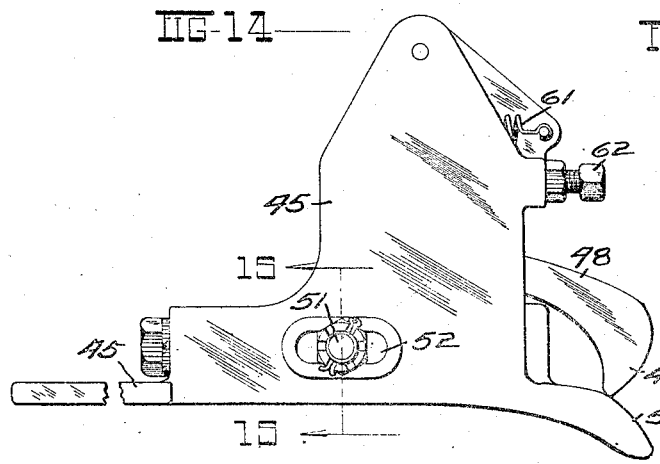
Figure 15:
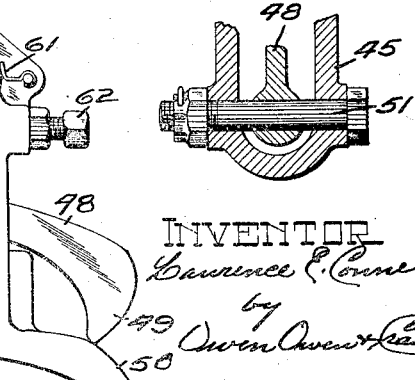

Figure 1 of the drawings illustrates a side view of one embodiment of the invention. Fig. 2 illustrates a longitudinal sectional view of the structure shown in Fig. 1. Fig. 3 illustrates a view similar to that shown in Fig. 2, the parts being shown in positions slightly different from that shown in Fig. 2. Fig. 4 is a rear view of the coupling shown in Figs. 2 and 3. Fig. 5 is a top view of the coupling. Fig. 6 is a horizontal sectional view showing a top view of parts of the coupling. Fig. 7 is a side view, parts thereof being shown in positions slightly different from that shown in Fig. 1. Figs. 8 to 13 inclusive illustrate modifications of the structure shown in Figs. 1 to 7 inclusive. Fig. 8 illustrates a top view of a modified form of structure containing the invention. Fig. 9 is a rear view of the structure illustrated in Fig. 8. Fig. 10 is a side view. Fig. 11 is a sectional view. Fig. 12 is a view similar to that shown in Fig. 11, the parts being shown in a slightly different position from that shown in Fig. 11. Fig. 13 is a sectional view taken on the line 13—13 indicated in Fig. 11. Figs. 14 to 17 inclusive illustrate a third modification of structures containing the invention. Fig. 14 illustrates a side view of the last mentioned modification. Fig. 15 illustrates a sectional view taken on the line 15—15 indicated in Fig. 14. Fig. 16 illustrates a longitudinal sectional view. Fig. 17 is a sectional view taken on the line 17—17 indicated in Fig. 16. Figs. 18 to 21 inclusive illustrate a fourth example of structures containing the invention. Fig. 18 is a sectional view of the last mentioned example. Fig. 19 is an end view of the hitch illustrated in Fig. 18. Fig. 20 is a side view, and Fig. 21 is a top view of the structure illustrated in Figs. 18 and 19.

In the couplings embodying my invention a member or part of the hitch is connected to the tractor as by one or more bolts or other suitable device, or the said member may be made a permanent part or integral with the tractor, and an engaging catch or dog that is controlled by a trip mechanism operated according to the draft or pull that may be exerted upon the dog and which is opposed by a yielding member, as by a spring, preferably a compression spring that engages a part of the member attached to the tractor, is supported on the member. The trip mechanism is preferably a combination of toggle elements that are deflected from the line of centers of the joints or pivots of the elements to trip the dog.

1, in the form of structure shown in Figs. 1 to 7 inclusive, is the member secured to the tractor. It may be provided with a pair of flanges suitably separated to be placed on the opposite side of the frame of the tractor, or on opposite sides of a rearwardly extending tongue or draw bar of the tractor.

The member 1 is provided with rearwardly extending lips 3 and 4 between which the connecting member of the trailing device may be inserted, such as the clevis of a plow, when it is to be connected to the tractor. The lip 3 terminates in a downwardly sloping portion that operates to guide the clevis into position to be connected with the hitch. A catch or dog 5 is located between the upper lips 4 and extends down to the lower lip 3, and thus extends across the space between the lips and so as to engage the clevis or other draft appliance that might be inserted between the lips.

The dog 5 is located in a frame or housing 6. It is pivotally connected to the housing by the pin 7. The rear edge of the nose of the dog, as at 8, is rounded or sloped so that when the draft member of the trailing device is inserted in the space between the lips the dog 5 will be raised to permit the draft member, such as the clevis of a plow, to be placed so as to be engaged by the dog after the clevis has passed the end of the dog.

In order to permit the dog 5 to be raised the housing 6 is supported for pivotal movements on the member 1. The housing 6 is provided with arcuate substantially semi-circular lugs 9, and the member 1 is provided with recesses 10 that conform in shape to the lugs 9 and form seats into which the lugs 9 are held. When the rear end of the housing 6 is raised the contacting surfaces of the lugs and seats slide one upon the other and thus the housing is raised when the dog is raised as when the draft member of the trailing device is inserted in position to be engaged by the hitch. The lugs are normally held in the recesses by the pressure of the spring 11 operating between a part of the member 1 and a part of the housing 6. The spring 11 is a compressor spring having one end seated in the bottom of a socket 12 formed in the member 1. The other end of the spring presses against a yoke 13 having laterally extending substantially cylindrical bearing lugs 14. The housing 6 is provided with downwardly and forwardly extending legs 15 that are located between the bearing parts 14 of the yoke 13 and the recesses 10, so that pressure of the springs on the yoke 13 yieldingly holds the lugs 9 in the recesses 10. The legs 15 also extend below a part of the member 1, which operates to hold the forward end of the housing in position on the member 1. Angular movement of the housing 6 causes a slight deformation of the spring 11 and consequently raising of the housing by insertion of the clevis beneath the nose of the dog 5 is yieldingly resisted by the spring. Since the movement of the housing caused by the insertion of the clevis into engaging position is a lever movement the movement of the spring is not in direct proportion to the movement of the tongue but is a small fraction of such movement and consequently the resistance to raising the dog is only sufficient to hold the dog and housing down to locate the dog in engaging position with relation to the clevis. When, however, the trailing device is drawn by the tractor the dog 8 engages the draft member of the trailing device, such as the clevis of the plow, and causes the housing 6 to be pulled directly against the pressure of the spring 11 since the draft is in line with the axis of the spring.

The dog 8 is held in engaging relation to the draft member of the trailing device by means of a toggle trip mechanism comprising a pair of toggle members 16 and 17. The member 16 is a link or a pair of links that connects the upper end of the dog 5 with the member 17 which is a spring pressed lever. The connected ends of the members 16 and 17 are raised and normally held against the part 18 of the housing by means of the spring 19. The part 18 thus forms a stop that operates to limit the upward pivotal movement of the members 16 and 17. The ends of the spring 19 are bent over the top edges of the sides of the housing and pass under a bolt 20 having engaging flanges or heads for holding the spring in position and which also operates as a pivot pin for the member 17 of the toggle. The spring 19 extends down and presses against one end of the bell crank lever 17 so as to yieldingly raise the other end of the lever. The points of relative pivotal movement of the members of the toggle are thus held substantially in alignment and any deflection therefrom is slight and their normal positions are maintained by the stop formed by the part 18 of the housing. Consequently the pull on the lower end of the dog 5 is transmitted through the toggle members, movement of the toggle members relative to each other being prevented by the stop formed by the part 18 of the housing. Movement of the housing as a whole is yieldingly resisted by the spring 11 and therefore the spring 11 is compressed according to the draft transmitted through the hitch from the tractor to the trailing device.

If the draft becomes too great the hitch is automatically operated to disconnect the trailing device from the tractor, which occurs when the spring 11 is compressed to a certain point. The member 17 of the toggle engages a suitable stop formed on the member 1 of the coupling, which operates to move the toggle away from the part 18 of the housing 6 and consequently to permit the upper end of the dog 5 to swing forward, which permits the nose of the dog to release the draft member of the trailing device. The lever 17 of the toggle is provided with a set screw 21 that may be adjustably secured in position by a suitable lock nut 22. The screw 21 is located in alignment with a part of the member 1, such as the projection 23, so that when the housing 6 is drawn forward a short distance and to a certain point as is determined by the setting of the screw 21, the end of the screw 21 will press against the part 23 of the member 1 and further movement of the housing will cause the toggle to break or trip the dog 5 and unhitch the trailing device from the tractor.

In the form of the invention illustrated in Figs. 8 and 9 the member 24 is connected to the tractor and a pair of engaging jaws 25 are pivotally connected together by the pin 26 which is suitably supported in a frame 27 formed by the bolts 28 and the sleeve 30 in which the pin 26 is located. Main draft springs 31 are located on the bolts 28 and between the washers or collars 32 and flange portions 33 formed integral with the member 24. The washers or collars 32 are secured from movement along the bolts 28 by the nuts 34 that are threaded on to the ends of the bolts.

In order to maintain the collars 32 in contact with ends of the springs, and in order to normally hold the jaws 25 in closed position springs 35 are also located on the bolts 28 and between the flange portions 33 of the member 24 and part of the frame 27. The springs 35 are of lighter weight and lighter pressure than the springs 31 and yieldingly operate to hold the collars 32 against the ends of the springs 31. A pair of collars 29 are located on the bolts 28 and are slidably movable along the bolts. They are located between the ends of the springs 35 and bosses 36 formed on the sleeve 30. A pin 37 interconnects the collars 29 and pivotally connects the toggle members 38 and 39 which operate to open the jaws 25.

The toggle members 38 and 39 connect forwardly extending ears 40 located on the jaws 25. The pressure of the springs 35 holds the collars 29 against the bosses 36 of the sleeve 27 and thus holds the pin 37 in line with the centers of the points of connection of the toggle with the ears 40 of the jaws 25 and consequently the springs 35 operate to normally hold the jaws closed.

When it is desired to connect the draft member of a trailing device, such as the clevis of a plow, into engaging relation with the jaws, the draft member of the trailing device is forced against the outer edges of the jaws, which moves the frame 27 forward against the pressure of the spring 35 until the upper end of the toggle member 38 strikes the arm 41, which causes the toggle to break and to pull the ears 40 of the jaws 25 towards each other. This operates to open the jaws and permit the insertion of the clevis. When the clevis has been inserted within the jaws the springs 35 are released from the pressure against the clevis and the springs 35 push the frame 27 outward and thus again place the pivotal centers of the toggle joint in alignment, which closes the jaws 25. When the tractor is pulling the line of draft is directly from the jaws to the springs 31 located on the bolts 28 that form a part of the frame 27.

When the pressure of the springs 31 is such as to compress them to a certain point, means is provided for opening the jaws to release the draft member forming a part of the trailing device. A threaded forked or bifurcated member 43 engages the member 24 to break the toggle and to open the jaws. The member 43 is connected to the pin 37 and extends through the arm 41. A pair of nuts 44 that operate to substantially lock each other in position is located on the member 43 and when the member 43 is pulled to a certain point one of the nuts 44 engages the arm 41 and further outward movement of the frame 27 causes the toggle to break and the jaws to open, and thus the trailing device is automatically unhitched from the tractor.

In the form of the invention illustrated in Figs. 14 to 17 the member 45 is connected to the tractor. It also is provided with the toggle having the members 46 and 47. One element 46 of the toggle is pivoted to the draft member 45, and the other element 47 of the toggle is connected to a lever 48 having an engaging nose 49 for engaging the draft member of a trailing device.

The member 45 is provided with a sloping lip 50 and the outer edge of the nose 49 is rounded or sloping towards the sloping surface of the lip 50 which operates to guide the draft member of a trailing device to a point between the end of the lever 48 and the lip 50. Upon pressure of the draft member of the trailing device at this point the lever 48 is raised, which permits the trailing device to be hitched to the tractor.

In order to raise the lever 48 to connect the trailing device to the tractor, the pivoted end of the lever is movable with respect to the member 45. The lever 48 is pivotally connected to a pin 51 that extends through slots 52 formed in the side walls of the member 45. The end of the lever 48 is preferably of spherical shape and is socketed in the heads of two spring pressed pins 53 and 54. The pin 53 is yieldingly pressed against the substantially spherical end of the lever 48 by means of the spring 55 which is held in position by the pin 56 and the flange 57 formed on the member 45. The spring 53 surrounds the pin 56 as well as the shank of the pin 53. The spring 58 is the main draft spring and is located between the flange 59 formed on the rear end of the member 45 and the head of the pin 54. The spring 55 is a light-weight spring and operates to hold the head of the lever 48 in position against the head of the pin 54 except as it is pressed forward by the pressure of the lever 48 against a draft member of a trailing device.

When the lever 48 is pushed forward the toggle is broken by the pressure of the finger 60 that is located on the lever that extends upward towards the point of connection between the elements of the toggle, such movement, however, being yieldingly resisted by the spring 55. It is also resisted by the tension spring 61 which is connected to the member 45 and to one of the toggle elements. Also when the lever is moved rearward the lower end of the toggle element 47 strikes the cross bar 63 supported between the sides of the member 45. This coacts with the finger 60 to break the toggle. When the toggle is broken it operates to lift the nose 49 and permit the entrance of the draft member of the trailing device to a point behind the nose of the lever and into position to be engaged by the nose 49. The instant that the draft member of the trailing device passes into position to be engaged, the lever 48 is released and the compression or tension of the springs 55 and 61 operate to place the pivotal centers of the toggle elements in alignment, which operates to lock the lever in position, the element 47 being drawn against the finger 60 by the spring 61. The draft on the trailing device is then directed through the lever 48 and against the spring 58, and when compressed to a certain point by movement of the lever 48 caused by the draft of the trailing device the toggle is broken.

An adjustable pin 62 is secured to the member 45 and its end is located in proximity to the point of connection between the toggles 46 and 47 so that when the toggle as a whole, together with the lever 48, is moved rearwardly to a certain point the toggle will be pressed against the end of the pin 62. On further movement rearwardly the toggle will be broken, which will cause the lever 48 to be raised, which will release the draft member of the trailing device. This will occur when some unusual resistance occurs to cause a compression of the spring 58 beyond a certain point.

In the structure illustrated in Figs. 18 to 21, inclusive, the member 64 is attached to the tractor and a fork 65 is pivotally supported on the member 64 by means of the pin 66. One of the ends of the fork extends between the lips 67 formed on the member 64. The lips 67 have inclined surfaces to guide the draft member of the trailing device into position to be engaged by the fork 65. The arm 68 of the fork member is located in the recess of a forked lever 69 having suitable cam surfaces for manipulating the arm 68. The lever 69 is supported on a spring pressed rod 70 which is guided and held in position by the member 64, it being located in a cross web 71 formed between the sides of the member 64. The rod 70 is spring pressed by the main draft spring 72 which is located between the web 71 and a collar 73.

In order to trip the engaging fork 65 a toggle connection between the controlling lever 69 and the member 64 is broken. The upper end of the lever 69 is connected by the toggle elements 74 and 75 to the member 64. When in locked position the connected ends of the toggle elements rest against the cross web 71 and they are yieldingly held in this position by the spring 76.

The draft is directly upon the fork 65, which, however, is held in position by the springs 72 operating through the rod 70 and the lever 69. The limit of the draft is regulated by the position of the collar 73 on the rod 70. The collar 73 is secured in position by the nut 77. If desired, the collar 73 may also be threaded on the rod 70 and the collar and the nut will coact to a certain extent to lock each other in position. When the draft exceeds a certain limit the toggle is broken by the flange 78 formed on the collar 73 engaging the ear 79 formed on the toggle element 75. Pressure of the flange 78 against the lug or ear 79 operates to raise the toggle element 75 so as to lift the connected ends of the toggle element away from the cross web 71 until the center of connection between the toggle elements pass the pivotal centers of the ends of the toggle, whereupon the toggle will be broken by the pressure of the arm 68 in the end of the forked lever 69 as well as by the spring 76. This will permit the upper end of the lever 69 to move rearward and the arm 68 to move forward, which will swing the forked end of the fork 65 outward and permit the releasement of the clevis or other draft appliance of a trailing device. This movement of the fork 65 will cause the upper end of the arm 68 to swing to a point substantially at right angles to one of the forks or fingers 80 of the forked lever 69 and prevent the return of the forked lever 69 until the clevis or other draft appliance is inserted into engaging position and pressed against one of the fingers or prongs 81 of the fork 65, which will cause the arm 68 to be snapped into the recess between the fingers or prongs of the forked lever 69. This will cause the other finger 82 of the fork 65 to engage the clevis or other draft appliance of the trailing device.

I claim:

1. In a vehicle coupling, a supporting member, a frame longitudinally slidably supported on the supporting member, a draft engaging member pivotally supported in the frame and for engaging the draft member of a trailing device, a toggle supported on the frame for controlling the draft engaging member, a spring located intermediate the frame and the supporting member and compressed by the draft of the trailing device, a trip for breaking the toggle to disengage the draft engaging member from the draft member of the trailing device when the frame moves beyond a certain point with reference to the supporting member.

2. In a vehicle coupling, a supporting member, a draft engaging member for engaging the draft member of a trailing device, a toggle for controlling the draft engaging member, a yielding member connected to the draft engaging member for resisting the draft through the draft engaging member, and means for automatically connecting the draft member and the draft engaging member by movement of the draft member towards the supporting member.

3. In a vehicle coupling, a movable draft engaging member, a yielding member for resisting the movement of the draft engaging member, a toggle movable with the draft engaging member and for locking the draft engaging member in engaging position, means operated by the movement of the toggle for tripping the toggle and the draft engaging member.

4. In a vehicle coupling, a movable draft engaging member, a yielding member for resisting the movement of the draft engaging member, a toggle movable with the draft engaging member and for locking the draft engaging member in engaging position, means operated by the movement of the toggle for tripping the toggle and the draft engaging member when the draft engaging member has been moved a certain distance in opposition to the pressure of the yielding member.

5. In a vehicle coupling, a supporting member, a frame movable relative to the supporting member, a yielding member for resisting the movement of the frame relative to the supporting member, a draft engaging member supported by the frame, a toggle connected to the engaging member and to the frame and for holding the engaging member in engaging position, means for tripping the toggle when the frame has been moved a predetermined distance in opposition to the resistance of the yielding member.

6. In a vehicle coupling, a supporting member, a frame movable relative to the supporting member, a yielding member for resisting the movement of the frame relative to the supporting member, a yoke for engaging the frame, the yielding member so located between the supporting member and the yoke, a draft engaging member supported by the frame, a toggle connected to the engaging member in engaging position, means for tripping the toggle when the frame has been moved a predetermined distance in opposition to the resistance of the yielding member.

7. In a vehicle coupling, a supporting member connected to the vehicle, a toggle supported by the supporting member, a draft engaging member for engaging the draft member of a trailing device and controlled by the toggle, a yielding member located on the supporting member for controlling the movements of the draft engaging member and means for tripping the toggle when the draft engaging member moves beyond a pre-determined point to release the draft engaging member from the draft member of the trailing device.

8. In a vehicle coupling, a supporting member, a draft engaging member for engaging the draft member of a trailing device and movable longitudinally with respect to the supporting member, a spring for yieldingly resisting the movements of the draft engaging member, a toggle for holding the draft engaging member in engaging relation to the draft member of the trailing device, means for tripping the toggle and releasing the draft engaging member when the draft engaging member has moved a pre-determined distance along the supporting member.

9. In a vehicle coupling, a supporting member, a draft engaging member for engaging the draft member of a trailing device and movable longitudinally with respect to the supporting member, a spring for yieldingly resisting the movements of the draft engaging member, a toggle for holding the draft engaging member in engaging relation to the draft member of the trailing device, means for tripping the toggle and releasing the draft engaging member when the draft engaging member has moved a pre-determined distance along the supporting member, the draft engaging member having a portion for angularly moving the draft engaging member by pressure against the said portion to press the draft member of the trailing device in engaging relation to the draft engaging member.

In testimony whereof, I have hereunto signed my name to this specification.

LAWRENCE E. CONNER.